March 21, 1967 P. C. BARRETT ET AL 3,310,078
SEMI-AUTOMATIC FILLING DEVICE
Filed May 5, 1964 2 Sheets-Sheet 1

INVENTORS
PAUL C. BARRETT
GEORGE W. STAMBAUGH

March 21, 1967 — P. C. BARRETT ET AL — 3,310,078
SEMI-AUTOMATIC FILLING DEVICE
Filed May 5, 1964 — 2 Sheets-Sheet 2

*INVENTORS*
PAUL C. BARRETT
GEORGE W. STAMBAUGH

BY

*ATTORNEYS*

3,310,078
SEMI-AUTOMATIC FILLING DEVICE
Paul C. Barrett, Kent, and George W. Stambaugh, Akron, Ohio, assignors to The General Tire & Rubber Company, a corporation of Ohio
Filed May 5, 1964, Ser. No. 365,079
6 Claims. (Cl. 141—348)

This invention relates to a filling device and, more particularly, to a semi-automatic filling device used with an air valve to pressurize a container with air or gas and to close the valve so as to maintain the pressure in the container.

An air valve of the type for which the filling device of the present invention is to be used is described in copending application 314,973, filed Oct. 9, 1963, and entitled, "Air Valve," which application was filed in the names of Wurgler and Stambaugh, the latter being one of the co-inventors of the present invention. The above-mentioned valve, the description of which is considered as being incorporated herein, is especially designed to provide for the easy pressurizing and depressurizing of containers. Its construction prevents accidental or unintentional displacement or damage thereto, and the action of the air being expelled from the container during depressurizing renders the valve relatively self-cleaning. This valve is provided with a circular valve opening, having recessed therein a pliable elastomeric sealing element of generally cylindrical configuration and having a circular flange at one end. This sealing element is cam loaded whereby rotation of the cam axially compresses the element causing it to radially expand into engagement with the valve opening thus operating to block said opening. The application also claims the features of a manually operated filling device which is designed to engage the valve in an airtight relationship. To operate this device, a suitable socket wrench is manually engaged with the sealing element and is rotated to actuate the cam, thus opening or closing the valve.

One object of this invention is to provide a semi-automatic filling device to engage a valve in sealing relationship and to open and close the valve while so engaged.

Another object is to provide an apparatus which telescopically engages a valve having a deformable sealing element and which utilizes pneumatic pressure to engage a suitable socket with the valve sealing element.

Yet another object is to provide a filling device requiring less dexterity and skill to operate than manually operated types.

It is still another object of this invention to provide, for use with a valve utilizing a deformable sealing element, a semi-automatic filling device comprising a housing adapted to fit over the valve, a valve actuating means mounted within the housing, means for rotating the actuating means, and pneumatic means for engaging said valve actuating means with the valve upon rotation of said actuating means.

These and other objects will become apparent upon reading the following specifications and claims and referring to the appropriate drawings in which:

Figure 1:
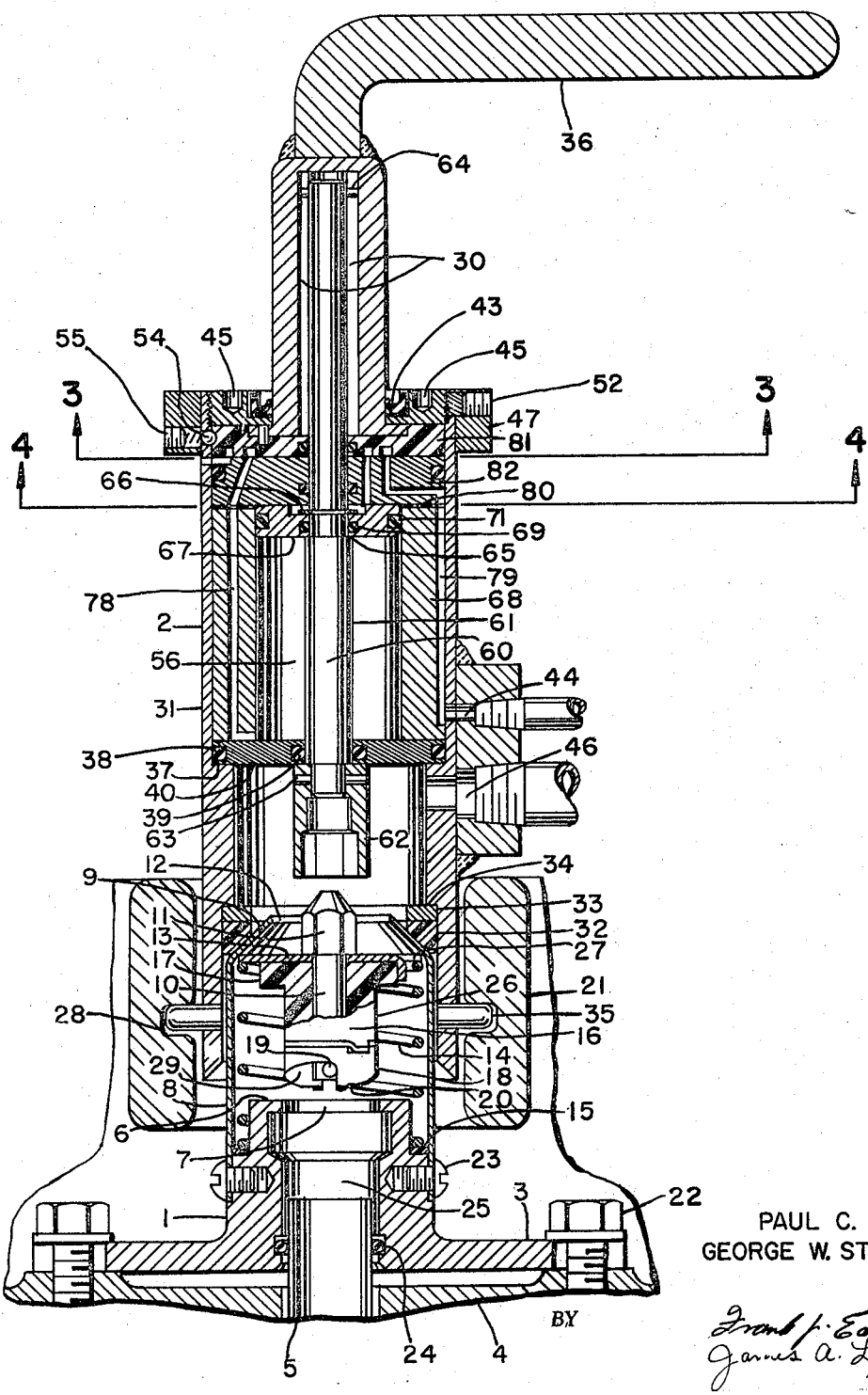
FIG. 1 is a cross-sectional view of the filling device telescopically engaged with a valve which is in the open position.

Referring now to the drawings where like numbers refer to like parts, there is shown in FIG. 1 a sealing valve 1 in a pneumatic system, and a novel filling device 2 characterized by a semi-automatic operation. The device is provided so that it can be used to open or close the valve while in airtight engagement therewith.

Figure 2:
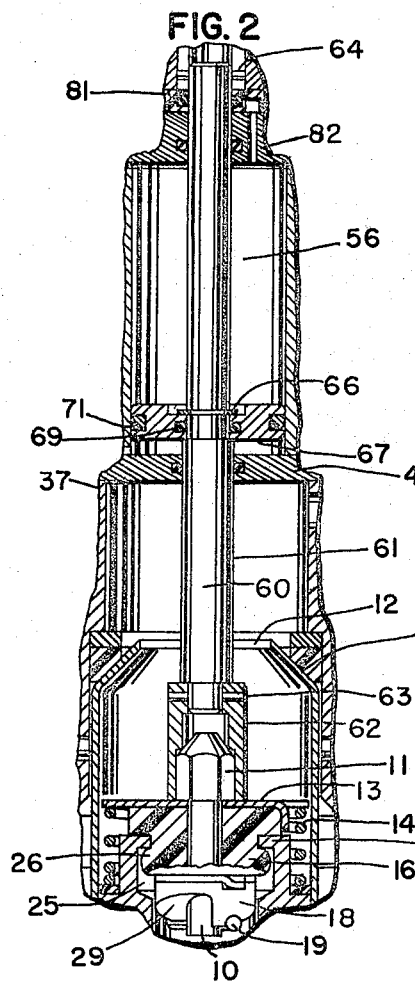
FIG. 2 is a partial cross-sectional view of the filling device engaged with the valve which is in the closed position.

The general type of valve for which it is intended that our novel filling device be used is shown in FIGURES 1 and 2. Basically this valve consists of a base 3 secured by bolts 22 to a container 4 to be pressurized, and is provided with an annular passageway 25 extending therethrough. Conduit 5 communicating with the interior of the container to be pressurized, is positioned within the lower end of the passageway 25 and is held in airtight engagement therewith by suitable means such as O-ring 24. Flange 6 defines the upper end 7 of the passageway 25.

A cylindrical wall 8 is in tight engagement with base 3 being held in place by suitable cap or machine screws 23. The upper portion of the wall 8 terminates in an inwardly turned conical flange 9 defining openings 12. Within the wall 8 is a valve core 16 composed of a shaft 10, a deformable elastomeric sealing element 26, cup-shaped member 13 and cam 18. The shaft 10 is provided with a hexagonal shaped head 11 adapted to be engaged by the actuating tool 61 within the housing 31 of the filling device. The cup-shaped member 13 is provided with a plurailty of projections 27 extending radially outwardly and terminating a short distance from wall 8. The sealing element 26 has a flanged portion 17, having a larger diameter than the upper end 7 of passageway 25 and which is adapted to fit within the cup-shaped member 13. Cam 18, preferably cemented or bonded to the sealing element 26 to rotate with it, is maintained on shaft 10, and a pin 19 through the shaft 10 bears against the camming surface 29. One end of a coil spring 14 in compression bears against projections 27 of member 13 and the other end against a suitable shoulder 15 on base 3.

As shown in FIG. 1 when the valve 1 is open, the coil spring 14 is under limited compression and the body of the sealing element 26 is of lesser diameter than the upper end 7 of passageway 25 and is in a position out of contact therefrom. With the sealing element in this position, air can be introduced into and released from the container through conduit 5 and passageway 25.

In FIGURE 2 is shown the valve in the closed position. To close the valve, the valve core 16 is biased downwardly to compress the coil spring 14 and to move the core 16 down through the upper end 7 of passageway 25 until the flange 17 of the sealing element 26 engages flange 6. Then the shaft 10 is rotated about ½ revolution whereby the cam 18 is caused to move toward the cup-shaped member 13 by pin 19 moving against the camming surface 29, whereby the camming action axially compresses the sealing element 26. This compression causes radial expansion of the sealing element 26, which is a deformable elastomer, thus serving to close off the upper end 7 of passageway 25. When the shaft 10 is rotated sufficiently, pin 19 slips into notch 20 in the cam, thus serving to lock the sealing element 26 in place.

Referring particularly to FIGURE 1, the present invention covers a detachable filling device 2 provided to fit over a valve, this device being characterized by a "semi-automatic" operation whereby pneumatic pressure is used to actuate part of the valve closing mechanism. This filling device 2 is composed of housing 31 adapted to slip over the wall 8 of valve 1 in sealing relationship thereto. An appropriate sealing means such as gasket 32 made of a soft elastomeric material or equivalent is cemented or otherwise held in place against an annular disc 33 positioned within the housing 31 against shoulder 34. Suitable means such as locking pins 35 on the side of the housing 31 fit into appropriate bayonet slots 28 in a flange 21 of the container 4 to be pressurized to hold the device 2 in place. With the device 2 locked in place, gasket 32 presses into airtight engagement with conical flange 9. Air from a pressurized source is introduced at inlet 46 through the housing 31 into the valve 1 through circular opening 12 and thence into the container 4 to be pressurized. The inlet 46 can be adapted to be connected or engaged to any suitable regulatable air pressure device such as a tire inflation gauge.

The sealing element actuating tool 60 slidably and rotatably positioned within the housing 31 consists of shaft 61 having a hex head socket 62 at the lower end held in place by a suitable locking pin 63, and a pin 64 through the upper end adapted to slidably fit into slots 30 in handle 36 to impart rotational motion to the shaft 61 when the handle 36 is turned.

The means whereby the actuating tool is brought into engagement with the hex head 11 of shaft 10 within the valve 1 comprises a piston-cylinder arrangement operated by pneumatic pressure through a network of channels and grooves. Maintained on shoulder 65 of the shaft 61 and held in place by a lock washer 66 is a piston 67 adapted for oscillatory motion within a chamber 56 formed by a cylindrical wall 68, bottom plate 40, and disc 82. A suitable gasket 80 may be used to maintain an airtight seal between the wall 68 and disc 82. Suitable means such as O-rings 69 and 71 on piston 67 prevent leakage of air past the piston, and corresponding rings 38 and 39 on the bottom plate 40, which abuts against shoulder 37 of the housing, provide for an airtight seal at this point. When the device is used under dusty or dirty conditions, appropriate dirt seals can be used in connection with the piston to insure maintenance-free operation.

Figure 5:
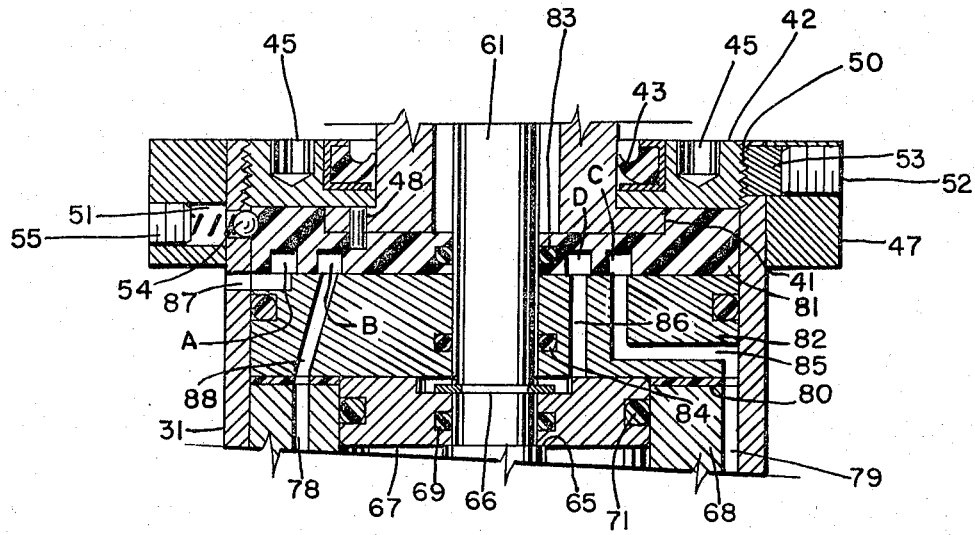
FIG. 5 is a fragmentary section of FIG. 1 on an enlarged scale showing details of the upper portion of the filling device including the upper and lower discs.

As noted in FIGURES 1 and 5, groove 79 in the wall 68 cooperates with the wall of the housing 31 to form a channel which is in communication at its lower end with a source of high pressure air introduced through inlet 44. The upper end of the channel engages with passage 85 in disc 82. Channel 78 in the wall 68 serves as a communication for air between the chamber 56 below the piston and passage 88 in disc 82.

Figure 4:
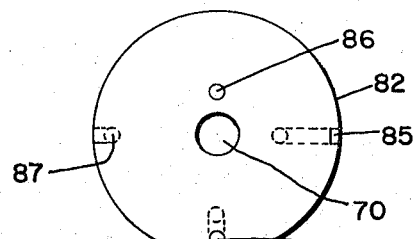
FIG. 4 is a cross-section along lines 4—4 of FIG. 1 showing the lower disc of the two-piece assembly.

Lower disc 82 which serves as the top of the piston chamber 56 is preferably fabricated from a hard metal such as steel. As seen in FIGURE 4, the disc is provided with an annular opening 70 through which shaft 61 passes and which is provided with an appropriate air seal such as O-ring 84. It is also provided with air passages 85, 86, and 88 (passages 86 and 88 are shown 90° out of position in FIGURES 1 and 5 for clarity) and exhaust port 87. To prevent the disc 82 from rotating, appropriate means such as a sleeve (not shown) may be press fitted into channel 78 with an upwardly projecting end adapted to be inserted into passage 88.

Figure 3:
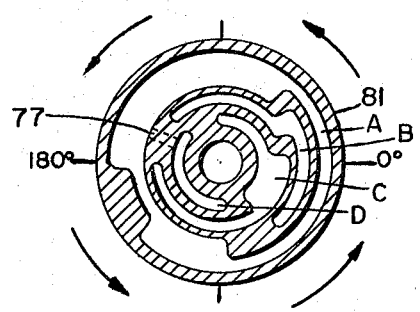
FIG. 3 is a cross-sectional view of the upper disc of a two-piece assembly within the filling device taken along lines 3—3 of FIG. 1 showing the network of channels used to pneumatically control the movement of the socket.

Upper disc 81, shown in FIGURE 3 is preferably fabricated from a machinable polymeric material such as Teflon or Delrin to provide a non-binding slidable mating surface with lower disc 82. Disc 81 is also provided with an annular opening through which shaft 61 passes, said opening fitted with air sealing means such as O-ring 83 to allow for vertical movement of the shaft without leakage. Grooves A, B, C, and D cooperate with port 87 and passages 85, 86, and 88 in disc 82 to control the pneumatic pressure in a manner which will be more fully explained hereinafter. Passage 77 serves to connect groove A with groove D. Pin 48 serves to engage the disc 81 with flange 41 of handle 36 so as to cause the disc to rotate with the handle.

Referring to FIGURE 5, plate 42 is screwed into the top of housing 31 and is provided with a grease and dirt seal 43 which bears against handle 36. The two ports 45 are adapted to receive a spanner wrench which is used to tighten this plate 42 against the upper surface of disc 81 and flange 41 to such a degree that the disc and handle 36 may be rotated without binding, yet with the provision that an airtight engagement is made at the mating surface of discs 81 and 82. Flange 47 can be welded or press fitted into place, or can be cast or otherwise fabricated as an integral part of the housing 31, and is provided with suitable apertures 50 and 51 adapted to receive set screws 52 and 55. After the plate 42 is threaded into place, set screw 52 is tightened against a piece of deformable material 53 such as lead or other relatively soft material which molds itself into the threads of the plate 42 thereby serving to lock the same in place. Aperture 51 is adapted to receive a spring-loaded ball bearing 54 which is held in place by a set screw 55, and which is provided to engage a detent in the peripheral surface of disc 81 prior to rotation of the handle 36. After each complete rotation of said handle, the bearing 54 again engages the detent.

As seen in FIGURE 3, the lower surface of the upper disc 81 is provided with a series of four generally concentric channels; A, B, C, and D, which channels cooperate with corresponding passages and grooves in the lower disc 82 and the cylinder wall 68. This cooperation, in connection with a source of pneumatic pressure, defines the action of the piston 67 and mode of operation of the actuating tool 60.

The filling device 2 is slipped into position over the valve 1, with the valve in the open position as shown in FIGURE 1, and is locked in place by engaging pins 45 in slots 28. Air under pressure is then introduced through inlet 46, through the housing 31 and the valve 1 into the container 4 until said container is pressurized to the extent desired, the amount of pressure conveniently being measured by a suitable gauge (not shown) on the pressure line or on the container. During this pressurizing, the handle 36 is preferably in a position such that the ball bearing 54 is in the detent of disc 81. The valve 1 is then closed by turning the handle 36 one complete revolution, during which the shaft 61 with the hex head socket 62 moves down into engagement with hex head 11 forcing the valve core 16 downwardly into opening 7 thereby compressing spring 14. The rotation of the handle 36 through the cycle compresses the elastomeric sealing element 26 thus serving to shut off the passageway 25 as shown in FIGURE 2.

More particularly, with ball bearing 54 in the detent in the periphery of the disc 81, the container 4 is pressurized to the extent desired. During the pressurizing operation, pressurized air (at e.g. 100 p.s.i.) introduced through inlet 44 passes up channel 79 and through passage 85 in lower disc 82 whereupon it is directed through channel B into passage 88 and down through duct 78 into the lower part of the chamber 56 where it exerts an upward force on piston 67. This keeps shaft 61 up and prevents premature engagement of socket 62 with hex head 11. At the same time, the air in the chamber 56 above the piston 67 is vented to the atmosphere through passage 86 which is in communication with channel D, passage 77, channel A, and exhaust port 87. When the container 4 is pressurized to the extent desired, the handle 36, and along with it, disc 81, is rotated clockwise about 45–50° whereupon the air pressure through passage 88 is blocked off and the chamber above the piston is disengaged from the exhaust port. Continued rotation of the handle 36 to a position which is about 80–90° from the starting point brings passage 85 (pressurized air) into communication with passage 86 through channel C and at the same time connects passage 88 with exhaust port 87. The pressurized air contacts the top of the piston 67 and drives it downward, thus bringing the hexagonal socket 62 into engagement with hex head 11. The air pressure is sufficiently high in relationship to the size of the piston 67 and the compressive strength of the spring 14 to bias the valve core 16 downward until the rubber flange 17 of sealing element 26 contacts and comes to rest against the shoulder of flange 6. Typically, air pressures of between about 40 p.s.i. and about 200 p.s.i. are found to be satisfactory for carrying out this operation.

As the handle is further rotated, the sealing element 26 is axially compressed and radially expanded until the pin 19 is seated in notch 20 of cam 18 at which point the passageway 25 is closed off. About ½ turn (180°) is necessary to accomplish this in the instant case although it is obvious that the angle of the camming surface 29, the deformation properties of the sealing element 26 and the size of said element relative to passageway 25 are factors which can alter this.

After the sealing element 26 is locked in place the chamber 56, on both sides of the piston 67, is vented to the atmosphere, the portion below the piston through duct 78, passage 88, channel A and exhaust port 87, and the portion above the piston through passage 86, channel D, passage 77, channel A and port 87. As rotation of the handle 36 and disc 81 is continued, the venting of the lower portion of the chamber 56 is discontinued and this lower portion becomes connected to the source of pressurized air through channel B. This last operation in the cycle permits the air pressure to drive the piston 67 up, thus disengaging socket 62 from hex head 11. The rotation of the handle 36 is completed when ball 54 again slips into the peripheral detent in disc 81. The filling device can then be disengaged from the valve.

It is to be noted that the above described stepwise rotation of the handle was descriptive only and that in actual operation, the rotation of the handle is done as one movement, all of the other functions involving the closing of the valve being carried out automatically.

When it is desired to depressurize the container 4, the filling device 2 is preferably disconnected at inlet 46 from the source of air used to pressurize said container, and is locked into engagement with valve 1. The handle 36 is then rotated counterclockwise and the operation as described above is carried out in reverse. As the handle 36 is rotated, the air pressure causes the valve actuating tool 60 to be biased downwardly into engagement with hex head 11. Further rotation causes the camming surface 29 of cam 18 to ride down on pin 19 thus permitting the body 16 of sealing element 26 to elongate axially and to become smaller in radial diameter than the restricted opening 7 of passageway 25. Continued rotation of handle 36 causes the actuating tool 60 to be driven upwardly by air pressure applied to the underside of piston 67 whereupon spring 14 and the air pressure within the container 4 cause the sealing element 26 to be biased upwardly out of engagement with passageway 25 thus permitting the pressurized air from within the container 4 to escape through passageway 25, housing 31 and the open inlet 46. It has been pointed out that the primary use of this novel filling device is for pressurizing a container and for maintaining the pressure while the valve is being closed. If desired, an ordinary socket wrench, rather than the filling device, may be used for releasing the pressure from the container inasmuch as very little skill is needed for this operation.

It is obvious that various modifications and arrangements of this device can be made without departing from the novel concept embodied therein. For instance, means other than pins and bayonet slots can be used to hold the device 2 in place over the valve 1; for example, the fitting could be adapted to threadedly engage the valve, or a quick disconnect coupling could be used. The housing 31 can be made from a variety of metallic or polymeric materials providing they are sufficiently rigid for the purpose intended. Where we have shown the use of shoulders and threads for positioning various parts of the device, these parts can be welded or otherwise held in place. Where two air inlets 44 and 46 are shown, a singular inlet with a split flow to the container 4 and to the valve actuating means 60 can be employed. Handle 36 could be replaced by other rotational means such as a standard valve handle or by a mechanically or electrically actuated mechanism. The solid shaft 61 could be replaced by means such as a two-piece shaft one part of which is telescopically engaged within the other.

The deformation characteristics of the elastomeric sealing element 26 as well as its cross sectional area as compared to the size of passageway 25 will dictate the amount of axial compression necessary to close the valve. These factors as well as the angle of the camming surface 29 of cam 18 will govern the angle through which the pin 10 must be rotated. These and other variables can be compensated for without departing from the invention by merely changing the pattern of one or more of the channels A, B, C, and D. It is obvious that the other changes can be made in these channels or the corresponding passages or grooves in disc 81 and wall 68 so as to vary the sequence of operations without materially affecting the functional relationship of the parts.

This filling device can be used with other types of valves embodying principals of operation, similar to those herein described. Furthermore, it can be used to fill containers with gases other than air, with liquids and in certain instances with finely divided solids. In addition, it is not essential that the substance be charged in to the container 4 through the housing 31, but instead may be introduced through separate passages or conduits into the container.

The above description was not intended as a limitation of the scope of the invention, but was intended instead to be a clarification thereof. The limitations will be found in the following claims.

What is claimed is:

1. A filling device for use with a valve containing a cam-operated compressible elastomeric sealing element comprising:
  (A) a housing adapted to telescopically engage said valve in an airtight relationship;
  (B) an air passage from an external source of air under pressure through said housing to said valve;
  (C) a shaft rotatably and slidably mounted within said housing and having a socket on one end to operate said cam;
  (D) a handle adapted to slidably receive said shaft and to impart rotational motion thereto; and
  (E) means operable in response to the rotation of the handle to slidably move said socket into and out of engagement with said cam, said means comprising
    (1) a cylinder within a housing,
    (2) a piston secured to the shaft and adapted for oscillatory movement within the cylinder, and
    (3) An assembly whereby air pressure from an external source is transmitted to the cylinder to operate the piston.

2. A device according to claim 1 wherein said air pressure transmitting assembly is composed of a first and a second annular disc axially and contiguously disposed to one another in slidable relationship, said first disc containing passages connected with a source of pressurized air and with said cylinder, and said second disc containing channels in the sliding surface and adapted to rotate with the handle, whereby rotation of said handle causes movement of said channels relative to said passages thereby determining the operation of said piston and shaft.

3. A filling device for use with a valve adapted to charge a container, said valve containing a valve unit having a cam-operated compressible sealing element, comprising in combination:
  (A) a tubular housing adapted to fit over said valve and having:

(1) an elastomeric gasket cooperative with the valve to provide an airtight engagement therewith,
(2) locking means for maintaining said engagement, and
(3) at least one air inlet in communication with a source of pressurized air;
(B) a rotatable handle cooperatively engaged with said housing and containing an elongated slot;
(C) a valve actuating tool including a shaft, one end of which is slidably positioned within said elongated slot, and the other end of which is attached to a socket adapted to engage said valve unit;
(D) means responsive to the rotation of said handle and to the air under pressure to alternately engage and disengage said socket with said valve unit including:
(1) a cylinder within said housing,
(2) a piston mounted on said shaft of said valve actuating tool within said cylinder in airtight engagement with said cylinder,
(3) An annular means in airtight engagement with said cylinder and said shaft to define an air chamber below said piston,
(4) a first disc in airtight engagement with said cylinder to define an air chamber above said piston and provided with individual passages in separate communication with said upper and lower air chambers, said air inlet and the atmosphere, and
(5) a second disc slidably engaged with said first disc and adapted to rotate responsively with said handle, and containing a plurality of channels arranged during rotation to successively communicate with said passages in said first disc thereby utilizing the air pressure to sequentially move said valve actuating tool into engagement with said valve unit, maintain said tool in engagement during operation of said cam and sealing of said valve, and move said tool out of engagement with said valve unit.

4. A filling device for use with a valve containing a cam-operated compressible elastomeric sealing element comprising:
(A) a housing adapted to telescopically engage said valve in an airtight relationship;
(B) an air passage from an external source of air under pressure through said housing to said valve;
(C) a shaft rotatably and slidably mounted within said housing and having a socket on one end to operate said cam;
(D) a handle adapted to slidably receive said shaft and to impart rotational motion thereto; and
(E) means operable in response to the rotation of the handle to slidably move said socket into and out of engagement with said cam, said means comprising:
(1) a cylinder within said housing,
(2) a piston secured to said shaft and adapted for oscillatory movement within said cylinder, and
(3) an assembly whereby air pressure from an external source is transmitted to the cylinder to operate the piston, said assembly consisting of first and second annular discs axially and contiguously disposed to one another in slidable relationship said first disc containing four passages, a first passage in communication with a source of pressurized air, a second passage in communication with said cylinder above said piston, a third passage in communication with said cylinder below said piston and a fourth passage communicating with the atmosphere, said second disc adapted to rotate with said handle and containing in the surface adjacent to said first disc four generally concentric channels with the innermost channel in communication with the outermost channel by an appropriate passageway whereby rotation of the handle through a first predetermined arc of a circle brings said first passage into communication with said second passage through the second innermost concentric channel and said third passage into communication with said fourth passage through said outermost channel; rotation of the handle through a second predetermined arc of the circle brings said second passage into communication with the fourth passage through said innermost channel, said outermost channel and said connecting passageway, and the third passage into communication with said fourth passage through said outermost channel; and rotation of said handle through a third predetermined arc of a circle, brings said first passage of said first disc into communication with said third passage through the next to the outermost channel of said second disc, and the second passage into communication with the fourth passage through said innermost channel, said outermost channel and their connecting passageway.

5. A filling device for use with a valve of the type having a cam operated compressible elastomeric sealing element comprising:
(A) housing means adapted to engage the valve in fluidtight relationship,
(B) a shaft mounted within said housing means adapted for axial and rotational movement therein and provided with means at one end to actuate the cam,
(C) means to move said shaft axially and rotationally comprising:
(1) handle means rotationally engaging said shaft,
(2) a piston secured to said shaft and positioned within a cylinder, and
(3) an assembly connected to a source of air pressure and adapted, upon movement of said handle means to preselected locations, to sequentially axially move said shaft into engagement with said cam and thence to bias said sealing element into the valve passage, to retain said element in said passage during the actuation of the cam to compress said element to seal the passage, and to axially move said shaft out of engagement with said cam.

6. In combination with a valve used to close a passage to a pressurized container, said valve containing a valve core axially movable into, but normally displaced from, said passage by resilient means, said core having an axially compressible and radially expansible elastomeric sealing element, a filling device comprising:
(A) a housing adapted to be telescopically engaged with said valve and to be securely attached thereto,
(B) a handle associated with said housing and adapted for manual rotation, and
(C) shaft means slidably and rotatably mounted within said housing for acting upon said valve core,
the improvement comprising:
controlled pneumatic means upon rotation of the handle, for sequentially
(1) slidably engaging said shaft with said valve core and biasing said core along with the elastomeric sealing element into said passage,
(2) retaining said valve core within said passage while said elastomeric element is radially expanded into fluidtight contact with said passage and thereafter
(3) slidably disengaging said shaft from said core.

(References on following page)

References Cited by the Examiner

UNITED STATES PATENTS

| | | | |
|---|---|---|---|
| 2,410,966 | 11/1946 | Eaton | 251—14 X |
| 2,479,862 | 8/1949 | Payne | 215—53 |
| 2,707,483 | 5/1955 | Shafer | 215—14 X |
| 3,010,694 | 11/1961 | Lynch | 251—189 |
| 3,029,060 | 4/1962 | Anderson | 251—14 |

LAVERNE D. GEIGER, *Primary Examiner.*

H. BELL, *Assistant Examiner.*